(No Model.) 6 Sheets—Sheet 1.

F. CHALLONER.
SHINGLE SAWING MACHINE.

No. 570,539. Patented Nov. 3, 1896.

Witnesses:

Inventor:
Frank Challoner
By Attorneys:

(No Model.) 6 Sheets—Sheet 2.

F. CHALLONER.
SHINGLE SAWING MACHINE.

No. 570,539. Patented Nov. 3, 1896.

Witnesses
E. C. Asmus
Chas. L. Goss

Inventor:
Frank Challoner
By Winkler Flanders Smith Bottum & Vilas
Attorneys.

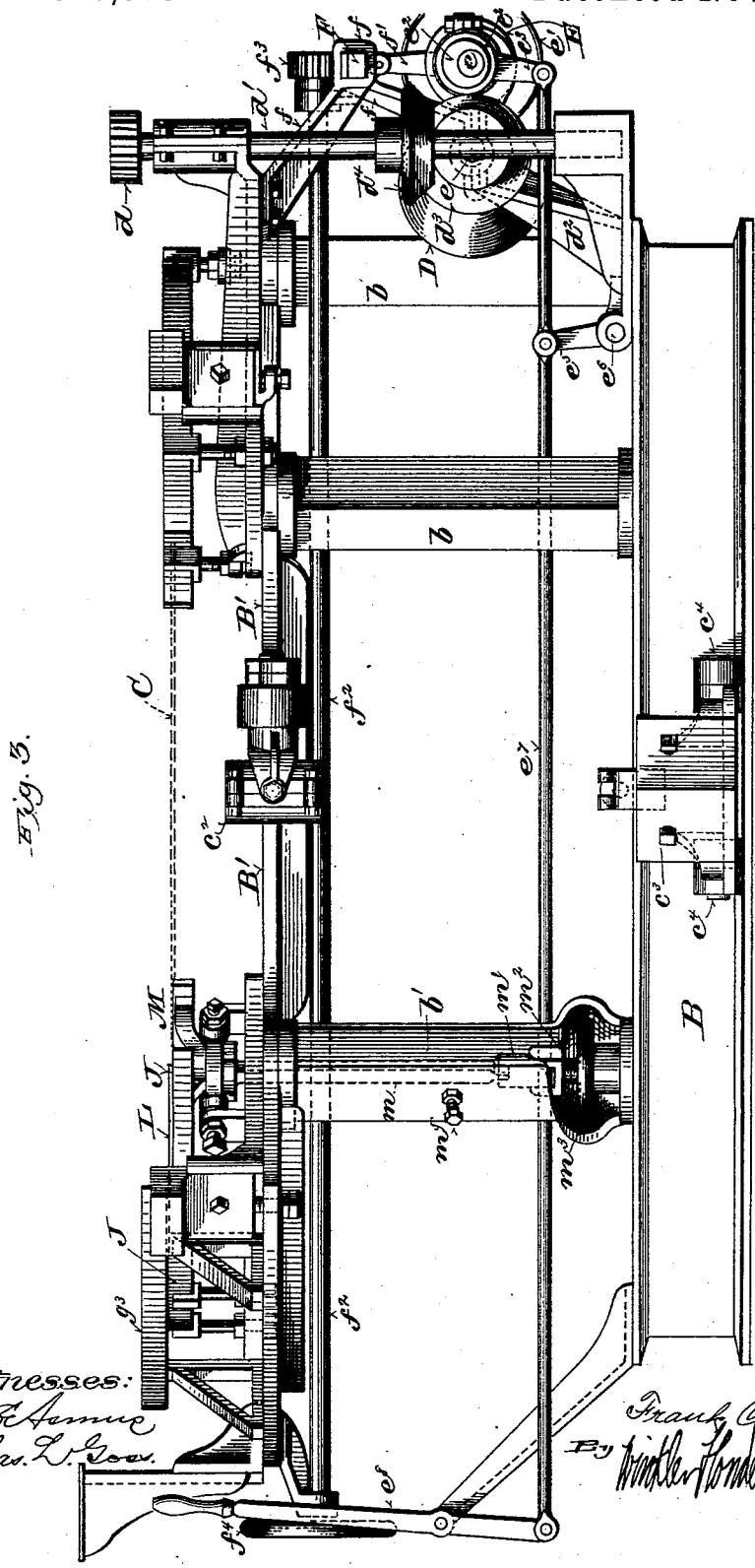

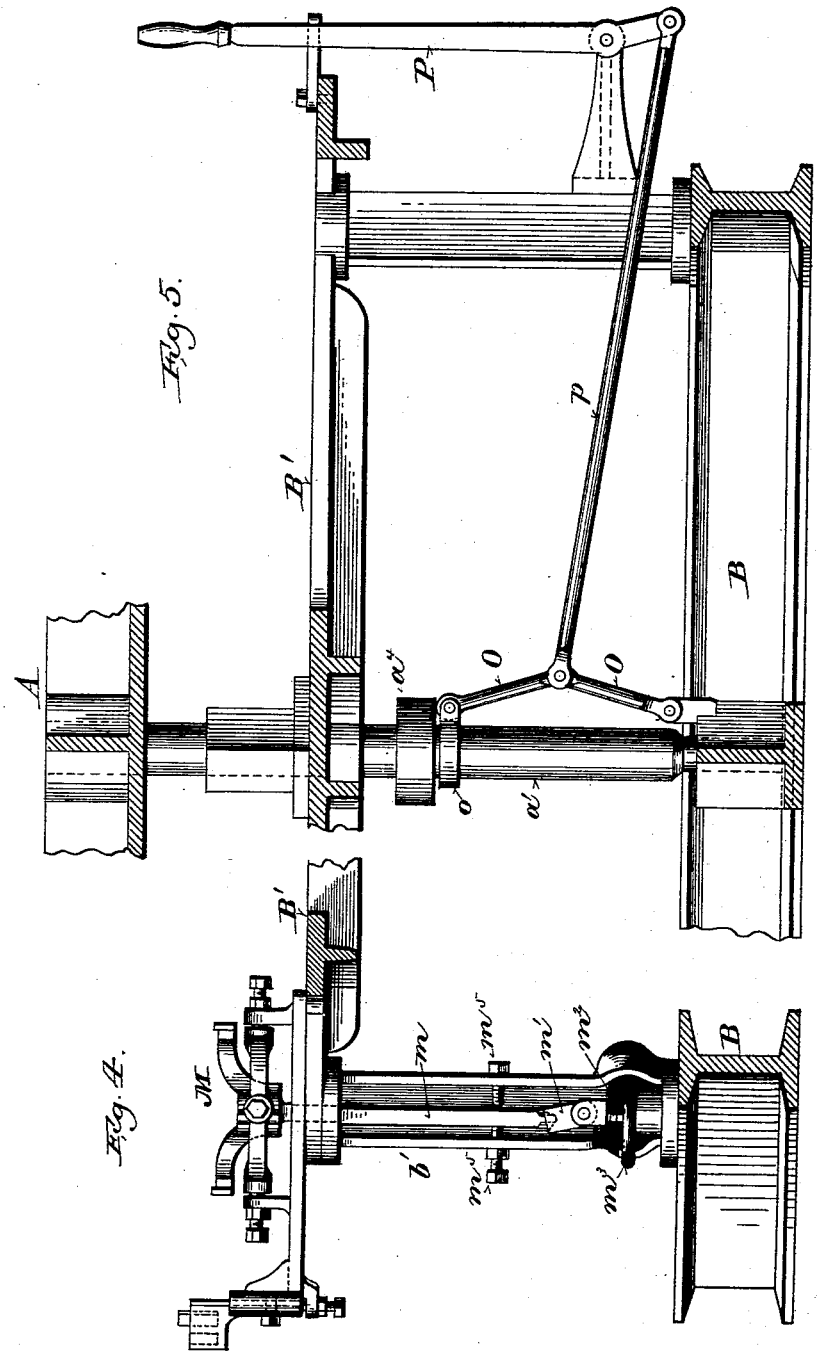

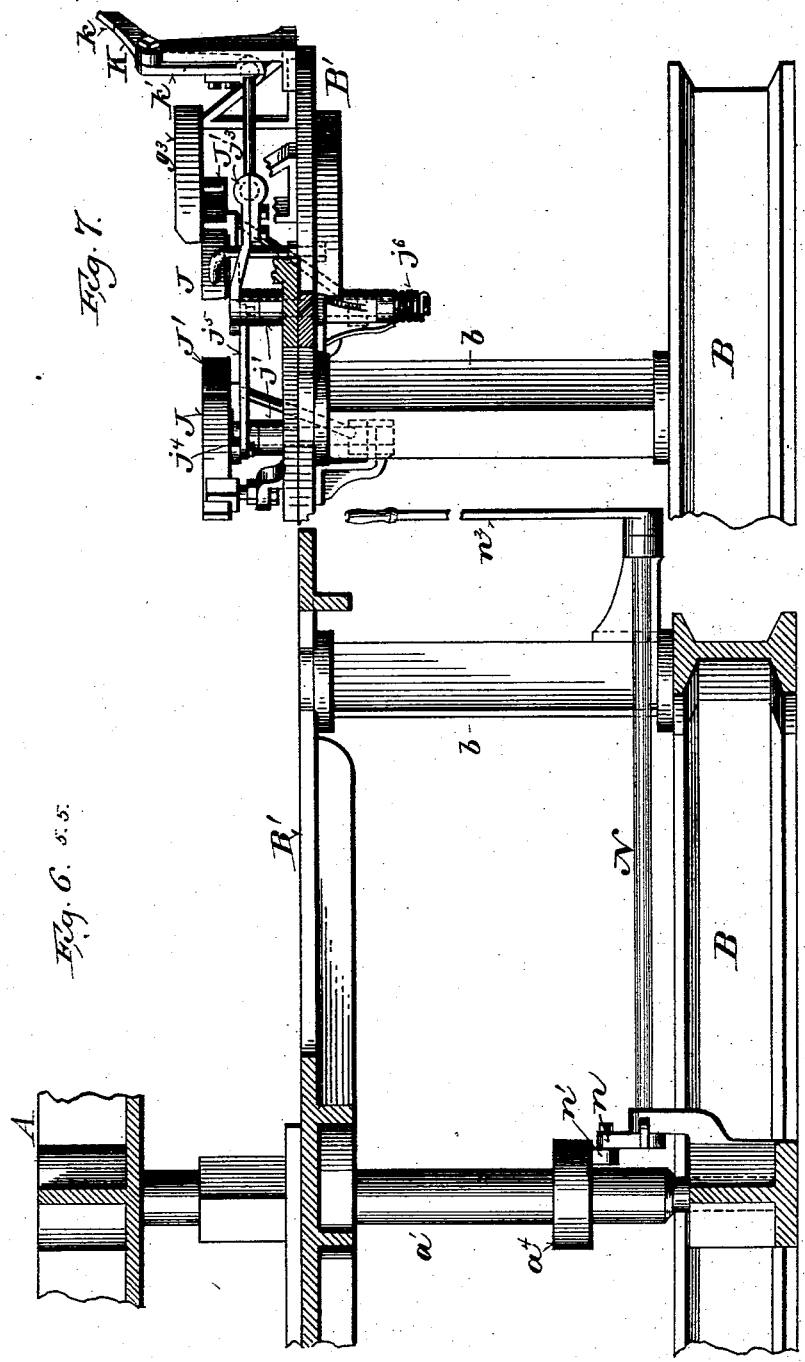

(No Model.) 6 Sheets—Sheet 6.
F. CHALLONER.
SHINGLE SAWING MACHINE.
No. 570,539. Patented Nov. 3, 1896.
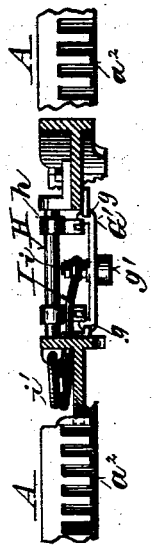
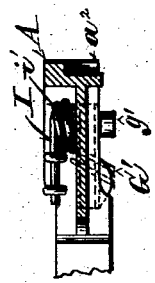
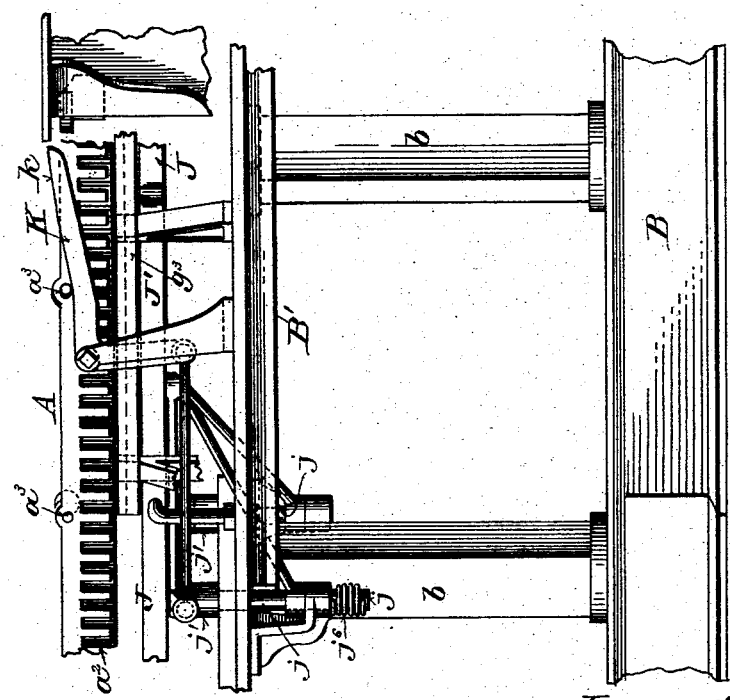
Witnesses:
Inventor:
Frank Challoner

UNITED STATES PATENT OFFICE.

FRANK CHALLONER, OF OSHKOSH, WISCONSIN.

SHINGLE-SAWING MACHINE.

SPECIFICATION forming part of Letters Patent No. 570,539, dated November 3, 1896.

Application filed March 31, 1892. Serial No. 427,304. (No model.)

*To all whom it may concern:*

Be it known that I, FRANK CHALLONER, of Oshkosh, in the county of Winnebago and State of Wisconsin, have invented certain new and useful Improvements in Shingle-Sawing Machines; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

My invention relates to that class of shingle-sawing machines in which a rotary carriage or bolt-carrier provided with a series of receptacles moves the shingle blocks or bolts in succession over the saw or saws. Its main objects are to provide an adjustable feed for the carriage, to simplify the dogging and spalting devices, and generally to improve the construction of machines of this class.

It consists of certain peculiarities of construction and arrangement, hereinafter particularly described, and pointed out in the claims.

In the accompanying drawings like letters designate the same parts in the several figures.

Figure 1:
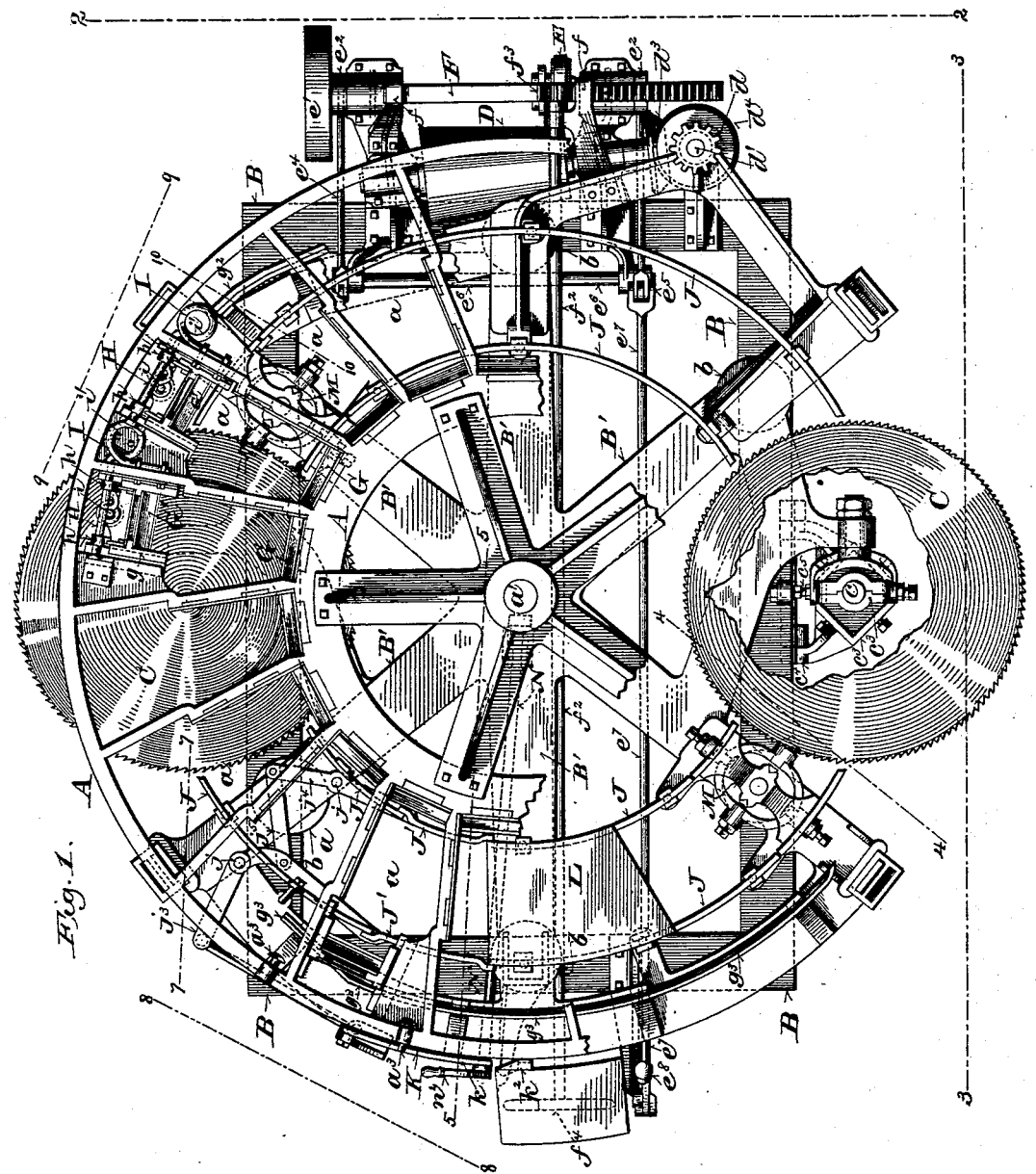
Figure 2:
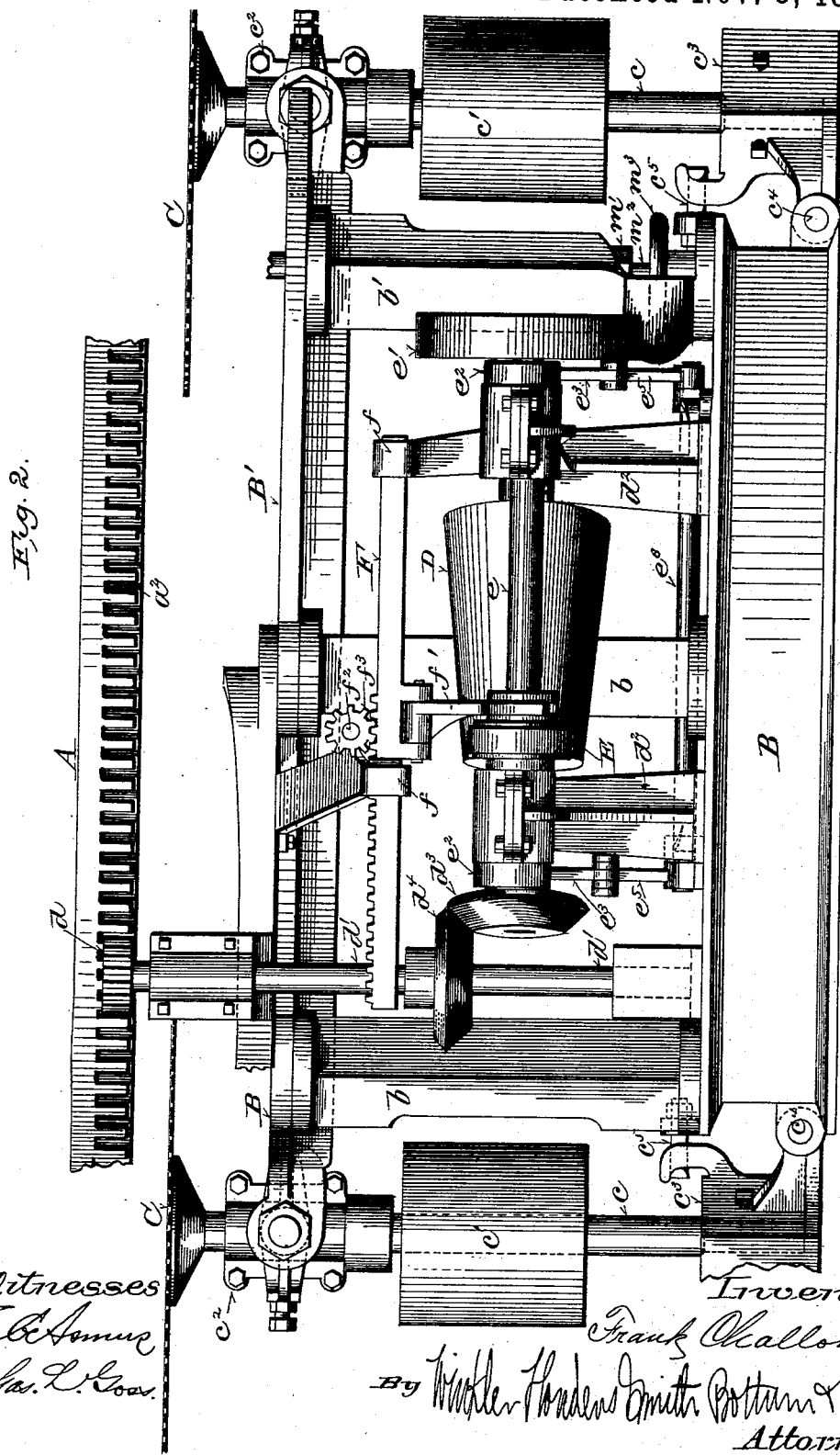

Figure 1 is a plan view of a machine embodying my improvements, certain parts being broken away to disclose underlying parts. Fig. 2 is a side elevation, on an enlarged scale, of the adjustable carriage-feeding mechanism viewed in the plane indicated by the dotted line 2 2, Fig. 1. Fig. 3 is a similar elevation viewed in a plane indicated by the dotted line 3 3, Fig. 1, at right angles to the plane of view of Fig. 2. Fig. 4 is a vertical section on the line 4 4, Fig. 1, showing one of the tilt-tables in elevation. Fig. 5 is a side elevation of a device for raising the carriage. Fig. 6 is a section on the line 5 5, Fig. 1, showing another device for the same purpose. Fig. 7 is a vertical section on the line 7 7, Fig. 1, showing the spalting mechanism. Fig. 8 is a side elevation of the spalting mechanism viewed in the plane indicated by the line 8 8, Fig. 1. Fig. 9 is a sectional detail of a portion of the carriage viewed in the plane indicated by the line 9 9, Fig. 1, and showing one of the dogging devices; and Fig. 10 is a sectional view of the same taken in the plane indicated by the line 10 10, Fig. 1.

A represents the carriage or shingle-bolt carrier, formed with a circular series of openings or receptacles $a\ a$, and mounted at the center upon the upper end of a vertical shaft $a'$, which turns in suitable bearings provided therefor in the frame of the machine, as shown in Figs. 5 and 6.

The main frame of the machine consists of a base B and a spider $B'$, supported therefrom by posts $b\ b$, as clearly shown in Fig. 2. It may be conveniently constructed of cast-iron.

C C represent the saws, which are located on opposite sides of the machine, a little below the carriage A, and mounted upon the upper ends of arbors $c\ c$, as shown in Fig. 2. These arbors are provided with pulleys $c'\ c'$, and are supported at their upper ends in boxes $c^2$, which have universal-joint connections with the upper portion $B'$ of the frame, and at their lower ends in step-boxes, which have universally-jointed connections with boxes $c^3$. The boxes $c^3$ are pivotally connected at $c^4$ with the base B of the frame, and are adjustably connected with said base above said pivotal connections by screw-bolts $c^5$, as shown in Figs. 2 and 3. By this means the arbors $c\ c$ and the saws C C may be adjusted vertically, the universally-jointed boxes in which said arbors are supported adapting themselves to any change in their position without binding.

The carriage A is provided at or near its periphery with a circular rack $a^2$, with which a pinion $d$ on the upper end of a vertical shaft $d'$ meshes, thereby imparting the desired movement to the carriage.

Referring to Figs. 2 and 3 in connection with Fig. 1, D represents a cone-pulley mounted upon a horizontal shaft, having bearings in brackets $d^2\ d^2$, rising from the base B of the frame, and provided at one end with a bevel friction-wheel or gear $d^3$, which engages with and drives a similar friction-wheel or gear $d^4$ on the vertical shaft $d'$.

E is a plain-faced friction-driver feathered or otherwise mounted upon the horizontal shaft $e$, so as to move lengthwise thereon and at the same time to be turned therewith. The shaft $e$ is supported in bearings provided therefor in the brackets $d^2$ approximately in the same horizontal plane with the axis of the cone-pulley D, and parallel with its adjacent face, as shown in Fig. 1. It is provided with a pulley $e'$, by which it is connected with any suitable or convenient source of power.

$e^2\ e^2$ are eccentrically-bored boxes carrying the shaft $e$, and themselves supported and capable of turning in boxes in the brackets $d^2$. They are formed or provided with depending arms $e^3$, which are connected by rods $e^4$ with upwardly-projecting arms $e^5$ on the rock-shaft $e^6$, located below and parallel with shaft $e$. One of the arms $e^5$ is connected by a rod $e^7$ with a lever $e^8$ on the opposite side of the machine within convenient reach of the operator. By means of the eccentric boxes $e^2\ e^2$ and their connections, just described, with lever $e^8$ the shaft $e$ is moved toward and from the cone-pulley D, carrying the friction-driver E into and out of engagement therewith. Directly above and parallel with the shaft $e$ a rack F is supported and movable longitudinally in bearings $f\ f$.

$f'$ is a forked arm engaging a groove in the hub of friction-wheel E, and pivoted at its upper end, on a line parallel with the shaft $e$, to said rack, thereby permitting the lateral movement of said shaft $e$ for the purpose of engaging and disengaging the friction-wheel E and cone-pulley D. A shaft $f^2$, extending horizontally across the machine, is provided at one end with a pinion $f^3$, which engages with the rack F, and at the opposite end, adjacent to lever $e^8$, with a hand wheel or crank $f^4$, whereby said rack may be moved longitudinally in its bearings, and thus shift the friction-wheel E lengthwise on the shaft $e$ along the cone-face of pulley D. By this means the feed of carriage A may be retarded or accelerated without interrupting the operation of the machine.

Each of the shingle-bolt receptacles in carriage A is provided at its inner end with a fixed dog G and at its outer end with a movable dog G', which is provided at the ends with guides $g\ g$, adapted to slide on ways parallel with the rear side of said receptacle. A shaft H, located outside of and parallel with said movable dog, is provided at or near its ends with arms $h\ h$, which are connected by links with the ends of said dog, thereby causing both ends to move together simultaneously, and preventing the guides $h$ from binding on their ways. Each movable dog G' is moved and held normally toward the corresponding fixed dog G by an elbow-spring I, attached centrally and pivotally thereto at $i$, extending therefrom to one side of the bolt receptacle and bent into one or more coils $i'$, and rigidly attached at the other end to the side of the receptacle, as shown in Figs. 1, 9, and 10. Each of the movable dogs is also provided on the under side with a roller $g'$, which engages on opposite sides of the machine with fixed inclines $g^2\ g^3$, which force the dog outwardly, releasing the shingle-bolt held thereby and allowing it to drop upon the tilt-tables or upon the spalting-ways, as the case may be. The incline $g^3$ on one side of the machine is extended concentrically with the carriage, so as to hold the dogs open on that side of the machine adjacent to the spalter and the tilt-table.

J J are curved ways placed between the saws below the bolt receptacles in the carriage and concentric therewith. On one side of the machine they are formed with laterally-movable sections J' J', which constitute a portion of the spalter. (Shown in detail in Figs. 7 and 8.) These movable sections J' are each provided with a vertical spindle $j$, which is supported and capable of turning in a box or sleeve $j'$, provided therefor on the frame. The outer spindle $j$ is provided with an outwardly-projecting crank-arm $j^3$, and the inner spindle $j$ is provided with a crank-arm $j^4$, which is connected by a link $j^5$ with the arm or bracket supporting the outer movable section J'.

K is a bell-crank lever formed with an incline $k$, located adjacent to and parallel with or tangential to the periphery of the carriage. It is fulcrumed at its elbow to a bracket rising from the upper part of the frame, so as to permit of the arm with the incline $k$ to swing vertically. The other shorter arm $k'$ of said lever is connected by a rod with the arm $j^3$, so that when the incline $k$ of lever K is depressed the movable sections J' J' will be simultaneously swung away from each other, thus presenting an opening in the curved ways through which a spalt dropped thereon is discharged. Between the spalter and the tilt-table on the adjacent side of the machine is a leaf or table L, upon which the shingle bolts or blocks are fed into the machine, while the movable dogs are held open by the extension of the incline $g^3$. The carriage A is provided in its rim with outwardly-extensible pins $a^3$, or other suitable trips, one for each of the bolt receptacles, arranged when projected to engage the incline $k$ of lever K, and thereby open the movable sections J' of the spalting-ways to discharge the spalt from the adjacent bolt receptacles. The track-sections J', after being opened by a trip-pin $a^3$, acting through the lever K and its connections, are returned to their normal positions by a spring $j^6$, coiled about one of the spindles $j$, as shown in Figs. 7 and 8. The pins $a^3$, after operating upon the incline $k$ of lever K, are returned to normal position in the carriage-rim by a fixed incline $k^2$. (Shown in Fig. 1.)

M M represent the tilt-tables, which have universally-jointed and vertically-adjustable connections with the upper portion B' of the frame, as shown in Figs. 1, 3, and 4. They are supported upon the upper ends of vertical bars $m\ m$, which are inclosed in the hollow posts $b'$, constituting a part of the framework of the machine and serving as housings for said tilt-bars $m\ m$ and their connections.

The tilt-bars $m$ rest at their lower ends in steps $m'$, which are pivoted to the bifurcated heads of adjusting-screws $m^2$. A nut formed with a hand-wheel $m^3$ serves to raise and lower each tilt-table.

$m^5$ $m^5$ are screws inserted through opposite sides of the post $b'$, inclosing each tilt-bar and constituting adjustable stops for limiting the swinging movement of said tilt-bar in either direction. One of these tilt-tables is located just in advance of each saw C, and the shingle-bolts are dropped and dogged thereon in succession before each shingle is cut from said bolts. The tilt-tables are set normally at opposite inclinations, so as to take the butts and points alternately from opposite ends of the bolts.

Referring to Fig. 6 in connection with Fig. 1, N represents a horizontal rock-shaft extending from a point near the center of the machine outwardly to a point near the position occupied by the operator. It is provided at its inner end with a crank-arm $n$, carrying a friction-roller $n'$ directly underneath a shoulder or collar $a^4$ on the shaft $a'$. At its outer end it is provided with a lever $n^2$, by which the arm $n$ may be turned upwardly, thereby carrying the friction-roller $n'$ into engagement with the collar $a^4$ and lifting the shaft $a'$ and the carriage A mounted thereon.

Referring to Fig. 5, illustrating another device for raising the carriage, O O are the links of a toggle-lever, one of which is pivoted to the box at the lower end of shaft $a'$ and the other to a collar $o$, loosely surrounding said shaft. P is an upright lever fulcrumed to one side of the machine adjacent to the position occupied by the operator and connected by a rod $p$ with the toggle-lever at the junction of its component links O O. The collar $a^4$ on the shaft $a'$ is located just above the upper end of the toggle-lever. By swinging the upper end of lever P outwardly the links O O of the toggle-lever are made to approach the same straight line, and, being thereby extended, engage with the collar $a^4$, and thereby raise the carriage.

It will be observed by the construction hereinbefore described that the operation of the dogs and spalter is effected directly through the medium of very simple mechanism, and that the construction of the machine is greatly simplified.

I claim—

1. In a shingle-sawing machine, the combination with a rotary carriage, of a cone-pulley geared therewith, a driving-shaft supported parallel with the adjacent face of said cone-pulley in eccentric boxes, which are provided with crank-arms, a rock-shaft parallel with said driving-shaft and provided with arms connected by rods with the arms on said boxes, a lever connected with said rock-shaft and arranged to turn said eccentric boxes and thereby move said driving-shaft toward and from said cone-pulley, a friction-driver mounted upon and movable lengthwise of said driving-shaft, a rack parallel with said driving-shaft and connected by a pivoted arm with said friction-driver, and a hand-wheel or crank-shaft, provided with a pinion working with said rack, whereby said driver is shifted to engage with different parts of said cone-pulley, substantially as and for the purposes set forth.

2. In a shingle-sawing machine, the combination with the carriage of a fixed and a movable dog, a rock-shaft parallel with the movable dog and provided with arms linked to opposite ends of said dog, a spring bent into one or more coils with its ends projecting therefrom substantially at right angles to each other, one being rigidly secured to said carriage and the other pivotally connected with the movable dog, a friction-roller journaled on a vertical stud or pin on said movable dog, and a fixed incline adapted to engage with said roller and open said dog at the desired point in the rotation of said carriage, substantially as and for the purposes set forth.

3. In a shingle-sawing machine, the combination with the rotary carriage provided with a series of bolt-receptacles, each receptacle having a trip movable by the operator into abnormal position, of oppositely-opening ways located below said bolt-receptacles on one side of the carriage and adapted to turn horizontally about the longitudinal axes of vertical spindles which are supported in bearings in the frame of the machine, and a lever fulcrumed to the frame of the machine, connected with said ways and provided with an incline which is located in the path of said trips when the same are projected into abnormal position so as to simultaneously swing said ways away from each other when a trip engages said incline, substantially as and for the purposes set forth.

4. In a shingle-sawing machine, the combination with a rotary carriage having a series of bolt-receptacles, each receptacle being provided with a trip movable by the operator into abnormal position, of ways located below said receptacles on one side of the carriage, and carried by vertical spindles which turn on vertical axes and are provided with arms connected by a link, so as to cause the opening and closing of one way to simultaneously open and close the other, a spring connected with one of said spindles and arranged to close and hold said ways in their normal positions, and a lever connected with an arm on one of said spindles, and provided with an incline located in the path of said trips when they are projected into abnormal position, substantially as and for the purposes set forth.

5. In a shingle-sawing machine, the combination with the carriage and a vertical saw-arbor, of a box-support pivoted at one side to the frame of the machine and connected therewith above its pivot by a horizontal adjusting-screw, and boxes for said arbor having universal-joint connections, one with the frame and the other with said support, whereby said carriage may be raised or lowered by turning said box-support on its pivot by means of said adjusting-screw and said arbor prevented from binding in its boxes, substantially as and for the purposes set forth.

6. In a shingle-sawing machine, the combination with the saw-arbor and the box in which it bears at its lower end, of a box-support pivoted at one side in a horizontal line with the frame of the machine and connected therewith above said pivotal connection by a horizontal adjusting-screw, whereby said box may be raised or lowered, and the arbor adjusted vertically, substantially as and for the purposes set forth.

7. In a shingle-sawing machine, the combination with the frame comprising a base and a top section, of a tilt-table supported upon the upper end of a vertical bar having a jointed connection at or near its upper end with the frame, and a vertically-adjustable pivoted supporting-step at its lower end, a hollow post constituting a supporting member of the top frame-section and a housing for said bar and its connections, and adjusting-screws threaded in opposite sides of said post and serving as stops for said bar, substantially as and for the purposes set forth.

In testimony that I claim the foregoing as my own I affix my signature in presence of two witnesses.

FRANK CHALLONER.

Witnesses:
JOHN C. KLEIST,
ELLA F. JACKMAN.